United States Patent
Bhat et al.

(10) Patent No.: US 10,720,126 B2
(45) Date of Patent: Jul. 21, 2020

(54) COLOR AMBIENT LIGHT SENSOR WITH ADJUSTABLE NEUTRAL DENSITY FILTER

(71) Applicant: Apple Inc., Cupertino, CA (US)

(72) Inventors: Akshay Bhat, Milpitas, CA (US); Rui L. Peterson, San Jose, CA (US); Tingjun Xu, San Jose, CA (US); Yan Guan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 16/119,834

(22) Filed: Aug. 31, 2018

(65) Prior Publication Data

US 2020/0074959 A1   Mar. 5, 2020

(51) Int. Cl.
| | |
|---|---|
| *G01J 1/42* | (2006.01) |
| *G09G 5/10* | (2006.01) |
| *G02F 1/163* | (2006.01) |
| *G02F 1/1523* | (2019.01) |
| *G01J 1/04* | (2006.01) |
| *H04N 9/73* | (2006.01) |

(52) U.S. Cl.
CPC .............. *G09G 5/10* (2013.01); *G01J 1/0492* (2013.01); *G01J 1/4204* (2013.01); *G02F 1/1523* (2013.01); *G02F 1/163* (2013.01); *G09G 2320/0626* (2013.01); *G09G 2320/0666* (2013.01); *G09G 2360/144* (2013.01); *H04N 9/735* (2013.01)

(58) Field of Classification Search
CPC ........ G09G 2360/144; G09G 2360/145; G01J 1/0271; G01J 1/4204; G01J 1/4228; H04M 1/22; H04W 88/00
USPC ................................ 250/214 AL, 208.1, 205
See application file for complete search history.

(56) References Cited

U.S. PATENT DOCUMENTS

| | | | |
|---|---|---|---|
| 6,481,851 B1 | 11/2002 | McNeeley et al. | |
| 7,294,959 B2 | 11/2007 | Cok et al. | |
| 7,736,006 B2 | 6/2010 | Freeman et al. | |
| 8,996,072 B2* | 3/2015 | Li | H04M 1/22 |
| | | | 455/566 |

* cited by examiner

*Primary Examiner* — Que Tan Le
(74) *Attorney, Agent, or Firm* — Treyz Law Group, P.C.; G. Victor Treyz; Matthew R. Williams (57) ABSTRACT

A color ambient light sensor may gather ambient light measurements during operation of an electronic device. The color ambient light sensor may have a color ambient light detector and an adjustable neutral density filter. The electronic device may have components such as a camera and display that are adjusted using ambient light information from the color ambient light sensor. The display may have a display cover layer. Pixels in an active area of the display may display images through the display cover layer. An inactive area of the display may have an opaque masking layer on an interior surface of the display cover layer. An opening in the opaque masking layer may form an ambient light sensor window for the color ambient light sensor. The adjustable neutral density filter may be interposed between the color ambient light detector and the ambient light sensor window.

20 Claims, 8 Drawing Sheets

COLOR AMBIENT LIGHT SENSOR WITH ADJUSTABLE NEUTRAL DENSITY FILTER

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate. Color ambient light sensors can detect changes in the color of ambient light so that compensating color cast adjustments can be made to displayed content.

It can be challenging to incorporate a color ambient light sensor into an electronic device. If care is not taken, a color ambient light sensor in an electronic device may not perform as accurately as desired or may be unsightly.

SUMMARY

An electronic device may be provided with a color ambient light sensor. The color ambient light sensor may gather ambient light measurements during operation of the electronic device. The color ambient light sensor may include a color ambient light detector having multiple channels each of which is associated with a photodetector overlapped by a color filter of a different color.

The electronic device may have components such as a camera and display that are adjusted using ambient light information from the color ambient light sensor. For example, the white point of a camera may be adjusted based on measured ambient light color. Display color and brightness may also be adjusted using information such as color and/or luminance values measured with the color ambient light sensor.

The display may have a display cover layer. Pixels in an active area of the display may display images through the display cover layer. An inactive area of the display may have an opaque masking layer on an interior surface of the display cover layer. An opening in the opaque masking layer may form an ambient light sensor window for the color ambient light sensor. The color ambient light sensor may have an adjustable neutral density filter such as an electrochromic device. The adjustable neutral density filter may be interposed between the color ambient light detector and the ambient light sensor window.

DETAILED DESCRIPTION

Figure 1:
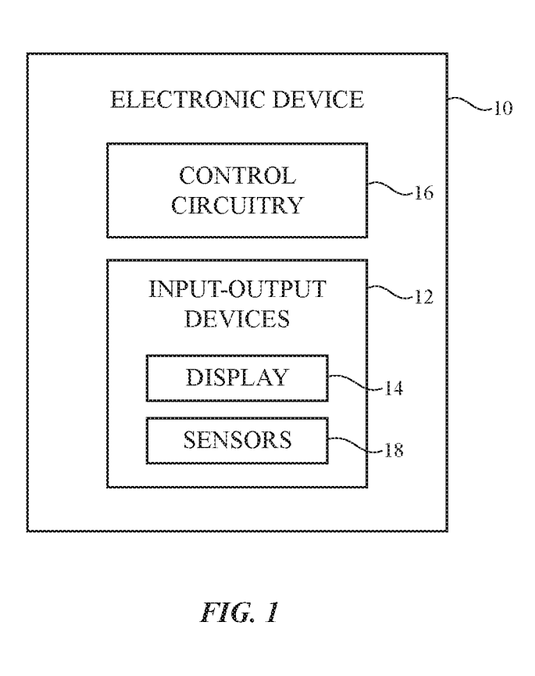
FIG. 1 is a schematic diagram of an illustrative electronic device having an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Control circuitry 16 may include wired and wireless communications circuitry. The wireless communications circuitry may include radio-frequency transceiver circuitry such as cellular telephone transceiver circuitry, wireless local area network transceiver circuitry (e.g., WiFi® (IEEE 802.11) transceiver circuitry), Bluetooth® transceiver circuitry, millimeter wave transceiver circuitry, near field communications (NFC) transceiver circuitry, or other communications circuitry. Wireless communications circuitry may be used to support voice and/or video telephone calls, to transmit and receive data, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a digital image sensor (e.g., a visible light camera having a visible light image sensor and associated lens), infrared image sensors, and other sensors. Sensors 18 may also include one or more color ambient light sensors. A color ambient light sensor may be used to measure the color (color spectrum, color temperature, color coordinates, etc.) of ambient light and may be used to measure ambient light intensity (luminance).

To make color measurements, a color ambient light sensor in device 10 may have multiple photodetectors each of which receives light through a different color filter. The color filters may have different colors that pass light at different respective wavelengths. In this way, the color ambient light sensor may make light intensity measurements in multiple different channels each of which is associated with a different color of light. The spectrum of ambient light can be determined from the relative intensities of the light measurements made by the photodetectors.

During operation, control circuitry 16 may use the color ambient light sensor to make measurements of the color and intensity of ambient light. These measurements may then be used to make adjustments to the operation of device 10. For example, when bright ambient light conditions are detected, control circuitry 16 may increase the brightness of display 14 and when dim ambient light conditions are detected, control circuitry 16 may decrease the brightness of display 14. As another example, the color cast of images displayed on display 14 can be adjusted based on ambient light color measurements from the color ambient light sensor. For example, the white point or other color settings associated with display 14 can be adjusted based on color ambient light measurements. Control circuitry 16 may, for example, adjust display 14 to make the images on display 14 more yellow in warm ambient lighting conditions and to make the images on display 14 bluer in cold ambient lighting conditions. Images captured with a digital image sensor (camera) in sensors 18 may also be affected by the color of ambient light. Control circuitry 16 may therefore make adjustments to the white point of a camera based on the measured color of the ambient light.

Figure 2:
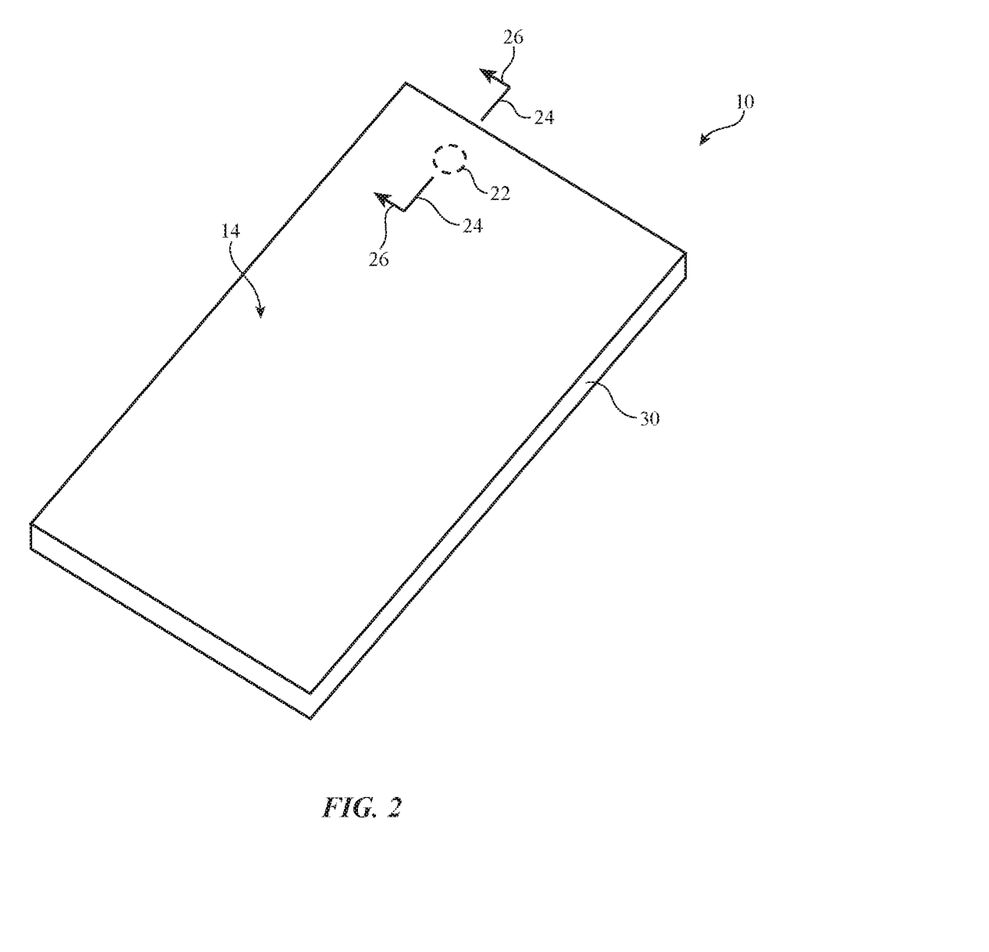
FIG. 2 is a perspective view of an electronic device with an ambient light sensor in accordance with an embodiment.

A perspective view of a portion of an illustrative electronic device is shown in FIG. 2. In the example of FIG. 2, device 10 includes a display such as display 14 mounted in housing 30. Housing 30, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 30 may be formed using a unibody configuration in which some or all of housing 30 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 30 to form communications ports (e.g., an audio jack port, a digital data port, etc.), to form openings for buttons, etc.

Display 14 may be a liquid crystal display, an electrophoretic display, an organic light-emitting diode display or other display with an array of light-emitting diodes, may be a plasma display, may be an electrowetting display, may be a display based on microelectromechanical systems (MEMs) pixels, or may be any other suitable display. Display 14 may have an array of pixels that extend across some or all of the front face of device 10 and/or other external device surfaces. The pixel array may be rectangular or may have other suitable shapes.

Optical components (e.g., a camera, a light-based proximity sensor, an ambient light sensor, status indicator light-emitting diodes, camera flash light-emitting diodes, etc.) may be mounted in an inactive portion of the display (e.g., a portion of the display without pixels), may be mounted along an edge of housing 30, may be mounted on a rear housing wall, may be mounted in a location that allows light to pass between pixels in display 14, and/or may be mounted in any other suitable location in device 10. In one illustrative configuration, one or more openings (sometimes referred to as windows) may be formed in an opaque masking layer that is formed on an interior portion of the display cover layer for display 14. For example, a light component window such as an ambient light sensor window may be formed in a peripheral portion of the front face of device 10 such as region 22. Ambient light from the exterior of device 10 may be measured by an ambient light sensor in device 10 after passing through region 22 and the display cover layer in region 22. If desired, other portions of device 10 may be provided with window regions to receive ambient light (e.g., openings may be formed in housing 30, etc.).

Figure 3:
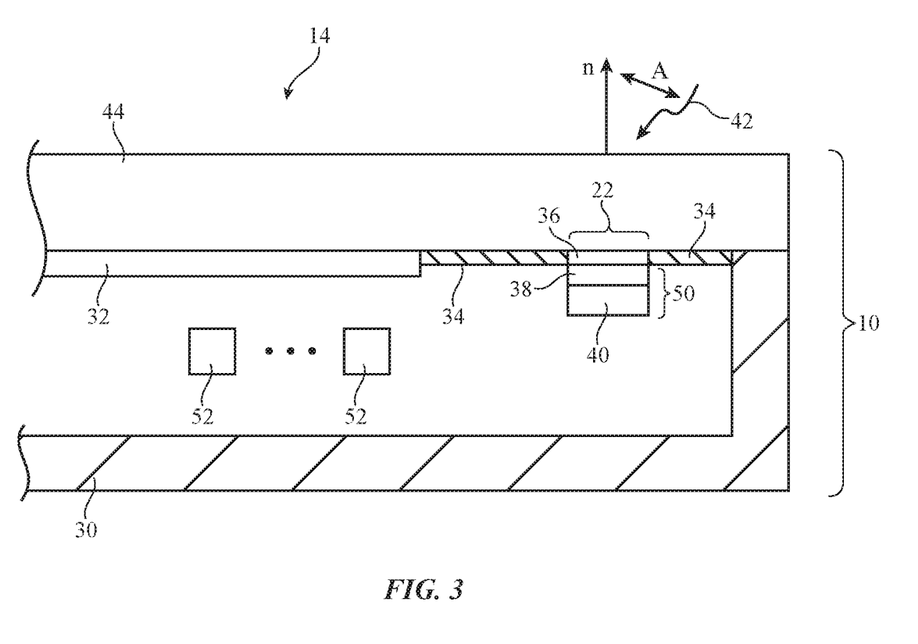
FIG. 3 is a cross-sectional side view of an illustrative ambient light sensor in an electronic device in accordance with an embodiment.

FIG. 3 is a cross-sectional side view of display 14 of FIG. 2 taken along line 24 and viewed in direction 26 of FIG. 2. As shown in FIG. 3, ambient light sensor 50 may be mounted in alignment with region (window) 22 (e.g., window 22 may overlap sensor 50). During operation, ambient light sensor 50 measures ambient light 42. Ambient light 42 may be produced by one or more light sources (i.e., the sun, artificial lighting, etc.). Ambient light 42 may reach device 10 directly and/or may be reflected towards device 10 from objects in the environment surrounding device 10. Incoming ambient light 42 may be characterized by rays of light that make an angle A with respect to surface normal n of display cover layer 44. In typical lighting conditions, ambient light 42 will be characterized by a range of angles A. Ambient light 42 may be measured by ambient light sensor 50 after passing through window 22

As shown in FIG. 3, ambient light sensor 50 may include color ambient light detector 40 and adjustable neutral density filter 38. Color ambient light detector 40 may be formed from a semiconductor substrate and may have multiple photodetectors (e.g., photodiodes, phototransistors, etc.) each of which has an associated color filter configured to pass light of a different respective color (e.g., a different respective band of wavelengths). Color ambient light detector 40 may have any suitable number N of photodetectors and associated color filters. For example, the value of N (which may sometimes be referred to as the number of channels for detector 40) may be 3-10, at least 4, at least 5, at least 7, at least 10, less than 25, less than 20, less than 15, less than 10, etc. During operation, color ambient light sensor 50 may measure the color and luminance of ambient light 42.

Display 14 may have an active area in which images are displayed for a user and may have one or more inactive areas such as inactive borders, notches (e.g., elongated notches running along the edge of device 10), inactive area islands surrounded by active area pixels, or other pixel-free portions that do not display images. A portion of display cover layer 44 may cover the active area of display 14. Pixel array 32 (e.g., an organic light-emitting diode display, a liquid crystal display, and/or other display layers that produce images for display 14) may be formed under display cover layer 44 in the active area and may display images during operation of device 10.

Display cover layer 44 may also cover inactive display areas such as pixel-free notches in the edge of display 14, pixel-free openings in the active region of display 14, pixel-free inactive borders, and/or other inactive regions in display 14. To hide components such as component 52 in the interior of device 10 from view from the exterior of device 10, the inactive area of display 14 may include an opaque masking layer. As shown in FIG. 3, for example, opaque masking layer 34 may cover the interior surface of display cover layer 44 in the inactive display area (i.e., the portion of display 14 not overlapped by the pixels of pixel array 32). Opaque masking layer 34 may have a visible light transmission of less than 3%, less than 1%, more than 0.1%, or other suitable amount. With one illustrative configuration, opaque masking layer 34 is formed from a material that is sufficiently opaque to block 99% or more or 99.5% or more of ambient light 42.

Opaque masking layer 34 may be formed from a layer of black ink (e.g., polymer with black embedded particles such as carbon black particles), may be a layer of ink of other colors (e.g., neutral colors such as white, silver, or gray, non-neutral colors such as red or blue, gold, etc.). Metal layers, thin-film interference filters thin-film mirrors, thin-film light-blocking filters, etc.) and/or one or more layers of other opaque materials may be used in forming opaque masking layer 34, if desired.

Display cover layer 44 may be formed from glass, plastic, ceramic, sapphire, or other transparent materials and may be a part of display 14 (e.g., a display substrate) or a separate protective layer that covers active display structures. A window such as ambient light-sensor window 22 may be formed from a selectively thinned region of opaque masking layer 34 on the inner surface of display cover layer 44 or may be formed from an opening in opaque masking layer 34. An opening in layer 34 that is associated with window 22 may be filled with optional window layer 36. Window layer 36 may be formed from ink (e.g., black ink, colored ink, etc.), a thin-film interference filter structure such as a thin-film mirror, a metal layer, or other structure and may have different materials and/or structures than surrounding layer 34.

Window layer 36 may be more transparent than opaque masking layer 34 to help pass sufficient light 42 to ambient light sensor 50 through window 22 to allow accurate ambient light measurements to be made. For example, window layer 36 may be formed from a more transparent type of ink and/or a thinner layer of ink than layer 34 to ensure that layer 36 transmits more of light 42 than layer 34. The shape of window 22 and layer 36 may be circular, rectangular, oval, and/or may have other suitable shapes (e.g., other outlines when viewed from the front of device 10).

The amount of light 42 that reaches detector 40 is determined by the collective light transmission of optional window layer 36 and adjustable neutral density filter 38. For example, the collective transmission of window material 36 (if present) and adjustable neutral density filter 38 may be 2-20%, may be 2-10%, may be 3-15%, may be at least 1.5%, may be at least 2%, may be at least 3%, may be at least 4%, may be at least 5%, may be less than 18%, may be less than 12%, may be less than 10%, etc.). In arrangements in which window layer 36 is present, window layer 36 may help block neutral density filter 38 from view from the exterior of device 10 and may help provide a matte appearance or other appearance to window 22 that matches surrounding portions of layer 34. In arrangements in which window layer 36 is not present, neutral density filter 38 may exhibit a relatively low light transmission value (e.g., 2-20%, 2-10%, 3-15%, at least 1.5%, at least 2%, at least 3%, at least 4%, at least 5%, less than 18%, less than 12%, less than 10%, etc.). This may help block internal components 52 of device 10 from view from the exterior of device 10.

The intensity of ambient light 42 may vary between dim (e.g., typical indoor light conditions or outdoor conditions at night) and bright (e.g., daytime outdoor conditions). The transmission of neutral density filter 38 may be adjusted dynamically to help ensure that the amount of light 42 that reaches detector 40 is within a desired operating range for detector 40 regardless of the intensity of light 42. For example, in dim lighting conditions the transmission of neutral density filter 38 may be increased, thereby enhancing the ability of detector 40 to measure ambient light without excessive noise. In bright lighting conditions, where there is a risk that the photodetectors in detector 40 could be saturated from excessive light exposure, control circuitry 16 may dynamically decrease the light transmission of adjustable neutral density filter 38, thereby decreasing the intensity of light reaching detector 40 and preventing detector saturation.

Figure 4:
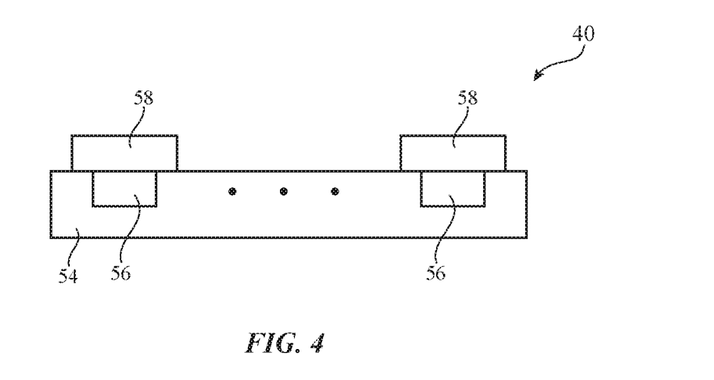
FIG. 4 is a cross-sectional side view of an illustrative color ambient light sensor in accordance with an embodiment.

FIG. 4 is a cross-sectional side view of an illustrative color ambient light sensor. As shown in FIG. 4, color ambient light detector 40 may include photodetectors 56 (e.g., photodiodes or phototransistors). Photodetectors 56 may be formed on one or more semiconductor substrates such as substrate 54 (e.g., a silicon substrate). Photodetectors 56 may measure incoming ambient light 42 after light 42 has passed through window 22 (e.g., through layer 44 and, if desired, through optional layer 36). Each photodetector 56 is overlapped by an associated color filter 58 that is configured to pass light of a different color (i.e., each color filter 58 has a different color and passes ambient light of a different respective band of wavelengths). Color ambient light sensor control circuitry such as portions of control circuitry 16 may therefore determine the light spectrum (intensity as a function of wavelength) of ambient light 42 by gathering signals from photodetectors 56.

Adjustable neutral density filter 38 may be formed from any suitable light modulator. With one illustrative configuration, which is sometimes described herein as an example, adjustable neutral density filter 38 is formed from an electrically adjustable optical modulator such as an electrochromic device. Other types of light modulator (e.g., a photochromic light modulator that changes optical density in response to ambient light exposure or other light exposure, etc.) may be used, if desired.

Figure 5:
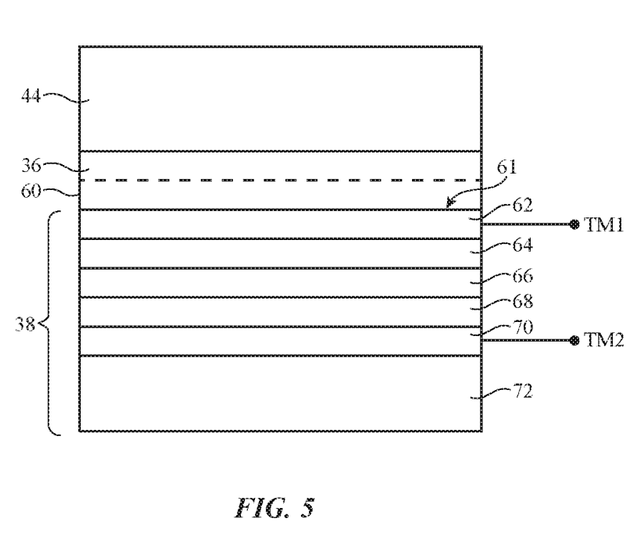
FIG. 5 is a cross-sectional side view of an illustrative adjustable neutral density filter for an ambient light sensor in accordance with an embodiment.

An illustrative neutral density filter formed from an electrochromic device is shown in FIG. 5. As shown in FIG. 5, neutral density filter 38 (e.g., an electrochromic device) may have a substrate such as substrate 72. Substrate 72 may be formed from clear polymer, glass, transparent crystalline material such as sapphire, or other suitable transparent substrate. Filter 38 may have transparent conductive electrodes 62 and 70 coupled respectively to control terminals TM1 and TM2. During operation, control circuitry 16 controls the electrical signal applied to terminals TM1 and TM2 to adjust the light transmission of filter 38. Electrodes 62 and 70 may be formed from layers of transparent conductive material such as indium tin oxide or other transparent conductive oxide (as an example).

First electrochromic layer 64 and second electrochromic layer 68 may be formed between conductive electrodes 62 and 70. The first and second electrochromic layers may be respectively a Li (lithium) doped NiO (nickel oxide) layer and a $WO_3$ (tungsten oxide) layer or other suitable layers of electrochromic material. Electrolyte layer 68 may be sandwiched between electrochromic layers 64 and 68. Electrolyte layer 68 may be, for example, a solid electrolyte layer such as a layer of silicon oxide ($SiO_2$). Application of electric signals to terminals TM1 and TM2 of filter 38 may cause Li+ migration between the NiO and WO3 layers, thereby adjusting the light transmission of filter 38. Layers 70, 68, 66, 64, and 62 may be deposited on substrate 72 during fabrication and may be attached to the inner surface of display cover layer 44 using clear adhesive such as polymer adhesive layer 60. An optional encapsulation layer (e.g., a layer of aluminum oxide ($Al_2O_3$)) may be formed on surface 61 of layer 62. Optional window layer 36 may be interposed between adhesive layer 60 and display cover layer 44, if desired.

With this type of configuration, filter 38 can be darkened (tinted) or lightened (bleached) or placed in a desired intermediate light-transmission state by adjusting the flow of current through layers 64, 66, and 68 using electrodes 62 and 70. Consider, as an example, a scenario in which layer 64 is a nickel oxide layer and layer 68 is a tungsten oxide layer. The NiO material of layer 64 is brownish in color when undoped, but turns transparent when doped with Li. The $WO_3$ material of layer 68 is bluish in color when doped by Li, but turns transparent when not doped by Li. When it is desired to darken device 16, a positive voltage may be applied to electrode 62 relative to electrode 70. This causes Li+ ions to be injected into electrolyte layer 66 from layer 64 and causes ions to form $LiWO_3$ complexes at the interface between layers 66 and 68, thereby coloring both layers 64 and 68 and darkening filter 38. When it is desired to render filter 38 transparent, a negative voltage may be applied to electrode 62 relative to electrode 70. This causes Li+ ions to be injected into layer 66 from layer 68, leaving behind undoped $WO_3$ in layer 68 and causes $LiNiO$ complexes to form at the interface between layers 64 and 66, thereby discoloring both layers 64 and 68 and rendering filter 38 transparent. States of intermediate transparency may be obtained by halting the state transition process partway between the tinted (opaque and less transmissive) and bleached (clear and more transmissive) states. The selected state of filter 38 may be relatively stable and may require modest amounts of power to maintain. Periodic refreshes to the state of filter 38 (e.g., periodic application of control signals to terminals TM1 and TM2 by control circuitry 16) may be used to help maintain a desired transmission state for filter 38.

The transmission spectrum of filter 38 may be relatively flat across visible light wavelengths of interest (e.g., across the visible light spectrum from 400 to 700 nm). This helps reduce angle-of-incidence-induced spectral shifts in the light transmission through filter 38 (changes in the spectrum of ambient light transmitted through filter 38 to detector 40 that vary as a function of ambient light incident angle A of FIG. 3). This may help improve the color accuracy of ambient light sensor 50.

Figure 6:
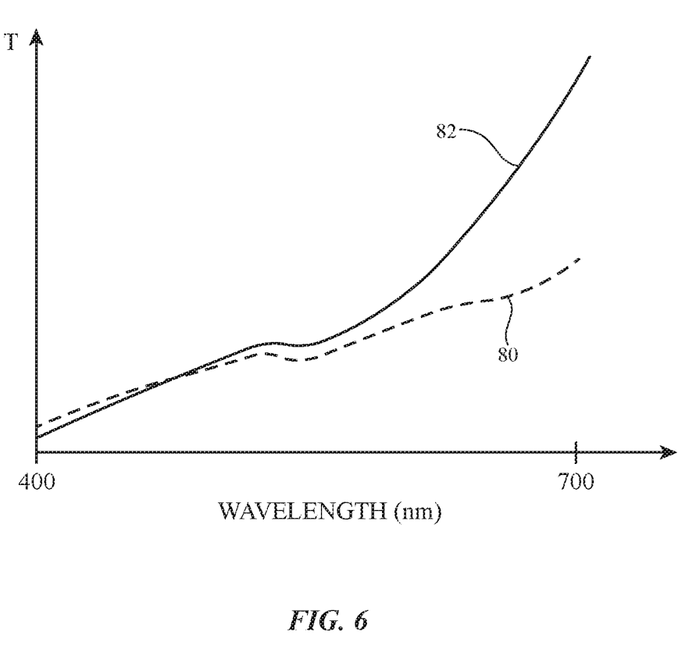
FIG. 6 is a graph in which light transmission as a function of wavelength through an illustrative ink layer has been plotted for two different angles of incidence for the light in accordance with an embodiment.

As shown in FIG. 6, for example, an illustrative dark ink layer (e.g., ink for covering an optical component window such as window 22) may exhibit a non-flat visible light transmission spectrum. As shown by curve 80, for example, the transmission of an ink layer may be less at 400 nm than at 700 nm. As a result of this non-flat spectrum, there can be significantly unequal amounts of light transmission across the visible light spectrum as ambient light passes through the ink. The angle of incidence of ambient light also affects light transmission. At an angle of incidence A (FIG. 3) of 0°, the light transmission of the ink layer may be represented by curve 80. At a higher angle of incidence (e.g., A=70°), the path length of a ray of ambient light through the ink layer will be greater than at normal incidence (A=0°) and this will result in an increased tilt in the visible light spectrum as illustrated by curve 82. In adjustable neutral density filter 38, in contrast, the visible light transmission spectrum is relatively flat (e.g., varying by less than 10%, less than 5%, less than 2, or other suitably small amount between 400 nm and 700 nm (across the visible light spectrum)), as shown by illustrative transmission spectrum T1 and illustrative spectrum T2 of FIG. 7.

As a result of the flatness of the neutral density filter transmission spectrum, angle-of-incidence-induced spectral tilt effects are significantly reduced (e.g., the light transmission spectrum of filter 38 at A=0° will not differ significantly from the light transmission spectrum of filter 38 at A=70°). The accuracy of color ambient light sensor measurements with ambient light detector 40 can thereby be increased by omitting ink in window 22 and relying exclusively on the opacity of filter 38 for blocking internal components from view through window 22 and/or by including both filter 38 and optional window layer 36 in window 22 while reducing the amount of ink in layer 36 relative to what would otherwise be desired for blocking components from view.

If desired, filter 38 can be adjusted dynamically. For example, when ambient lighting conditions are dim, the transmission of filter 38 can be increased (see, e.g., illustrative transmission T2 of FIG. 7). This enhances the amount of light reaching detector 40 and thereby decreases noise. When ambient lighting conditions are bright, the transmission of filter 38 can be decreased (see, e.g., illustrative transmission T1 of FIG. 7). This reduces the amount of light reaching detector 40 and helps prevent the photodetectors of detector 40 from becoming saturated.

Control circuitry 16 can adjust the light transmission setting of filter 38 based on ambient light luminance (brightness) data gathered by detector 40. If desired, control circuitry 16 can set the light transmission of filter 38 to one or more intermediate values (see, e.g., intermediate light transmission T3 of FIG. 7). The values of T1 and T2 may each be in the range of 1-20%, at least 0.5%, at least 1%, at least 2% at least 3%, at least 4%, at least 5%, at least 7%, at least 10%, at least 12%, at least 15%, at least 20%, at least 25%, less than 25%, less than 22%, less than 18%, less than 14%, less than 10%, less than 6%, less than 5%, less than 3%, less than 2%, or other suitable values. The ratio R of the maximum transmission (T2) of filter 38 to the minimum transmission (T1) of filter 38 may have a value of 1.5-20, at least 1.5, at least 2, at least 3, at least 4, at least 5, at least 10, at least 20, less than 20, less than 15, less than 7, less than 4, or other suitable value. As an example, T1 may be 4% and T2 may be 20%.

Figure 7:
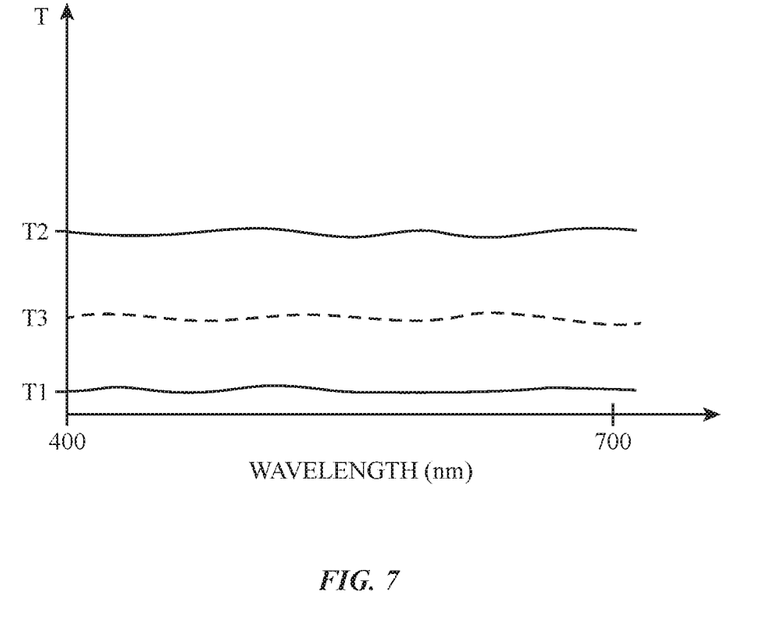
FIG. 7 is a graph in which light transmission has been plotted as a function of wavelength for an illustrative adjustable neutral density filter in accordance with an embodiment.

In bright lighting conditions, transmission T1 may be low, which helps obscure structures in the interior of device 10 from view from the exterior of device 10 (e.g., detector 40 will be invisible or nearly invisible to the naked eye). In dim lighting conditions, transmission T2 may be high, which decreases the ability of filter 38 to hide internal structures from view. Nevertheless, when lighting conditions are dim the amount of ambient light available to illuminate internal structures is low, which makes internal structures invisible or nearly invisible to the naked eye.

Figure 8:
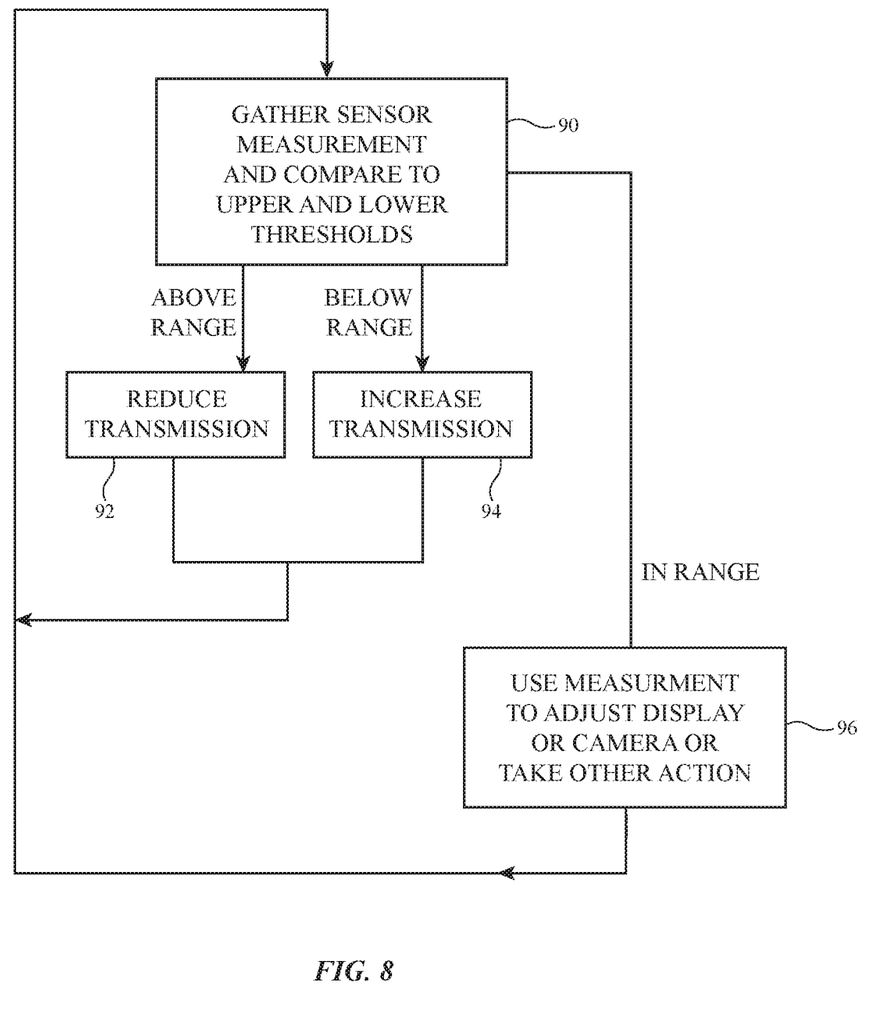
FIG. 8 is a flow chart of illustrative operations associated with gathering and using color ambient light sensor measurements in an electronic device in accordance with an embodiment.

Illustrative operations associated with using ambient light sensor 50 in device 10 are shown in FIG. 8.

During the operations of block 90, control circuitry 16 may use ambient light sensor 50 to gather ambient light sensor measurements. Color information (e.g., color coordinates, color temperature information, or other color data) and luminance (brightness) information can be gathered using detector 40. Control circuitry 16 knows the current light transmission setting of adjustable neutral density filter 38 and can therefore make compensating adjustments to raw color and luminance data gathered from detector 40 accordingly. For example, if the light transmission level of adjustable neutral density filter 38 is low, control circuitry 16 can take this known low light transmission level into account in computing the luminance of ambient light 42 (e.g., the luminance of ambient light 42 may be higher than indicated by the raw reading of detector 40 due to the enhanced light absorption by filter 38 when the raw measurements were gathered). If the light transmission level of adjustable neutral density filter 38 is high, control circuitry 16 can similarly take this high light transmission level into account in computing the luminance of ambient light 42 (e.g., the luminance of ambient light 42 may be lower than indicated by the raw reading of detector 40 due to the enhanced light transmission level of adjustable neutral density filter 38 when the raw measurements were gathered).

After gathering ambient light color and luminance data (e.g., an ambient light color measurement represented as a color temperature or color coordinates and an ambient light luminance measurement indicating the brightness of ambient light 42), control circuitry 16 may determine whether the ambient light luminance measurement is within a desired operating range for sensor 50. For example, control circuitry 16 may compare the ambient light luminance reading to a lower (minimum desired) luminance threshold and an upper (maximum desired) luminance threshold.

In response to determining that the measured luminance is below the lower luminance threshold, control circuitry 16 may increase the light transmission level of adjustable neutral density filter 38 during the operations of block 94 (e.g., from T1 to T2, from T1 to an intermediate value such as T3, or from an intermediate value such as T3 to T2). Processing may then loop back to block 90, so that another ambient light measurement can be made with sensor 50. The increased light transmission level of filter 38 will help ensure that sufficient ambient light reaches detector 40 to allow an accurate measurement to be made without excessive noise.

In response to determining that the measured luminance is above the upper luminance threshold, control circuitry 16 may decrease the light transmission level of adjustable neutral density filter 38 during the operations of block 92 (e.g., from T2 to T1, from T2 to an intermediate value such as T3, or from an intermediate value such as T3 to T1). Processing may then loop back to block 90 so that another ambient light measurement can be made with sensor 50. The decreased light transmission level of filter 38 will help ensure that ambient light detector 40 is not saturated due to excessive ambient light.

In response to determining during the operations of block 90 that the measured ambient light luminance is within a desired operating range for sensor 50 (e.g., determining that the luminance value that is gathered with sensor 50 is above the lower luminance threshold and below the upper luminance threshold), control circuitry 16 may take suitable action at block 96. During the operations of block 96, control circuitry 16 may, for example, use the value of the measured ambient light luminance to adjust the brightness of display 14. In dim lighting conditions, for example, display brightness may be reduced so that the content on display 14 is not uncomfortably bright for the user. In bright lighting conditions, display brightness may be automatically increased so that the content on display 14 remains visible and is not obscured by glare. As another example, control circuitry 16 may use measured ambient light color information to adjust the color cast (e.g., the white point) of display 14. If, as an example, ambient lighting conditions are cold, the white point of display 14 may be shifted to a colder value to ensure that there is not an undesirable color mismatch between the content on display 14 and the user's current ambient lighting environment. If desired, control circuitry 16 may adjust the color settings (e.g., the white point) of one or more cameras in device 10 (e.g., visible light digital image sensors in sensors 18) based on the measured ambient light color. If, as an example, warm lighting conditions are detected, a camera white point may be adjusted to a warmer setting. An adjustable aperture, shutter speed, or other camera settings may be adjusted based on measured ambient light luminance. If desired, other adjustments may be made to the operation of input-output devices 12 based on color and luminance measurements from ambient light sensor 50. The use of ambient light sensor information to make display and camera adjustments is illustrative.

Table of Reference Numerals

| | | | |
|---|---|---|---|
| 10 | Electronic Device | 12 | Input-Output Devices |
| 14 | Display | 16 | Control Circuitry |
| 18 | Sensors | 22 | Window |
| 24 | Line | 26 | Direction |
| 30 | Housing | 32 | Pixel Array |
| 34 | Layer | 36 | Window Layer |
| 38 | Filter | 40 | Light Detector |
| 42 | Light | 44 | Cover Layer |
| 50 | Light Sensor | 52 | Component |
| 54 | Substrate | 56 | Photodetectors |
| 58 | Color Filter | 60 | Adhesive Layer |
| 61 | Surface | 62 | Electrode |
| 64, 66, 68 | Layers | 70 | Electrode |
| 72 | Substrate | | |

The foregoing is merely illustrative and various modifications can be made to the described embodiments. The foregoing embodiments may be implemented individually or in any combination.

What is claimed is:
1. An electronic device, comprising:
a housing;
a camera in the housing;

a display in the housing having a display cover layer, wherein the display has a pixel array that displays images through a portion of the display cover layer in an active area of the display, wherein the display has an opaque masking layer on a surface of the display cover layer in an inactive area of the display, and wherein an ambient light sensor window is formed in the opaque masking layer;

a color ambient light sensor having a color ambient light detector aligned with the ambient light sensor window and having an adjustable neutral density filter interposed between the ambient light sensor window and the color ambient light detector; and control circuitry in the housing that:
gathers a first ambient light measurement with the color ambient light sensor;
adjusts the adjustable neutral density filter using the first ambient light sensor measurement;
gathers a second ambient light measurement with the color ambient light sensor; and
adjusts a component using the second ambient light measurement, wherein the component comprises a component selected from the group consisting of: the display and the camera.

2. The electronic device defined in claim 1 wherein the adjustable neutral density filter comprises an electrochromic device.

3. The electronic device defined in claim 2 wherein the control circuitry compares an ambient light luminance value in the first ambient light measurement to a lower threshold and an upper threshold, wherein the control circuitry adjusts the adjustable neutral density filter to increase ambient light transmission through the adjustable neutral density filter in response to determining that the ambient light luminance value is below the lower threshold, and wherein the control circuitry adjusts the neutral density filter to decrease ambient light transmission through the adjustable neutral density filter in response to determining that the ambient light luminance value is above the upper threshold.

4. The electronic device defined in claim 3 wherein the adjustable neutral density filter includes first and second transparent electrodes, first and second electrochromic layers between the first and second transparent electrodes, and a solid layer between the first and second electrochromic layers.

5. The electronic device defined in claim 4 wherein the first electrochromic layer comprises nickel oxide, wherein the second electrochromic layer comprises tungsten oxide, and wherein the solid layer comprises silicon oxide.

6. The electronic device defined in claim 3 wherein the control circuitry is configured to adjust a brightness level of the display using the second ambient light measurement.

7. The electronic device defined in claim 3 wherein the display has an associated white point setting and wherein the control circuitry adjusts the white point setting using the second ambient light measurement.

8. The electronic device defined in claim 3 wherein the camera has a white point setting and wherein the control circuitry is configured to adjust the white point setting using the second ambient light measurement.

9. The electronic device defined in claim 2 further comprising a layer of ink in the ambient light sensor window that overlaps an opening and that is interposed between the display cover layer and the adjustable neutral density filter.

10. The electronic device defined in claim 2 wherein the electrochromic device has a visible light transmission spectrum that varies by less than 10% between 400 nm and 700 nm.

11. The electronic device defined in claim 2 wherein the color ambient light sensor comprises an array of photodetectors on a semiconductor substrate and wherein each photodetector is overlapped by a respective color filter with a different respective color.

12. The electronic device defined in claim 2 wherein the control circuitry comprises wireless transceiver circuitry.

13. An electronic device, comprising:
a housing;
a camera in the housing;
a display in the housing;
a color ambient light sensor having an adjustable neutral density filter and having a color ambient light detector that receives ambient light that passes through the adjustable neutral density filter; and
control circuitry in the housing that uses luminance information from the color ambient light sensor to adjust the neutral density filter.

14. The electronic device defined in claim 13 wherein the adjustable neutral density filter comprises an electrochromic device.

15. The electronic device defined in claim 14 wherein the control circuitry comprises wireless transceiver circuitry and wherein the control circuitry uses color measurements from the color ambient light sensor to adjust the display.

16. The electronic device defined in claim 15 wherein the control circuitry uses luminance information from the color ambient light sensor to adjust the display.

17. The electronic device defined in claim 16 wherein the display comprises a display cover layer, wherein a portion of the display cover layer is covered with opaque masking material, and wherein an ambient light sensor window in the opaque masking material is aligned with the adjustable neutral density filter.

18. The electronic device defined in claim 17 wherein the opaque masking material comprises a first layer of ink that has an opening that forms the ambient light sensor window and wherein the ambient light sensor window includes a second layer of ink that has a light transmission that is greater than the first layer of ink.

19. A portable electronic device, comprising:
a housing;
a camera in the housing;
a display in the housing having a display cover layer, wherein images are displayed through the display cover layer in an active area of the display and wherein ambient light passes through an ambient light sensor window in an inactive area of the display;
a color ambient light sensor having a color ambient light detector with multiple channels and having an adjustable neutral density filter interposed between the ambient light sensor window and the color ambient light detector; and
control circuitry in the housing that adjusts the adjustable neutral density filter using an ambient light measurement from the color ambient light sensor.

20. The portable electronic device defined in claim 19 wherein the control circuitry is configured to adjust a selected one of: the camera and the display using information from the color ambient sensor.

* * * * *